United States Patent [19]

Hall

[11] Patent Number: 5,331,035
[45] Date of Patent: Jul. 19, 1994

[54] PROCESS FOR THE PREPARATION OF IN SITU DISPERSION OF COPOLYMERS

[75] Inventor: James E. Hall, Mogadore, Ohio

[73] Assignee: Bridgestone Corporation, Tokyo, Japan

[21] Appl. No.: 995,118

[22] Filed: Dec. 22, 1992

[51] Int. Cl.$^5$ .................................................. C08K 3/02
[52] U.S. Cl. ..................................... 524/457; 524/461; 526/201
[58] Field of Search ................... 524/457, 461; 526/201

[56] References Cited

U.S. PATENT DOCUMENTS

| | | | |
|---|---|---|---|
| 4,098,980 | 7/1978 | Markle et al. | 526/201 |
| 4,829,135 | 5/1989 | Gunesin et al. | 526/201 |

*Primary Examiner*—Joseph L. Schofer
*Assistant Examiner*—Peter D. Mulcahy
*Attorney, Agent, or Firm*—Frank J. Troy, Sr.

[57] ABSTRACT

The present invention relates to a process for the dispersion copolymerization of 35 to 70% by weight of vinyl substituted aromatic monomer and 30 to 65% by weight of conjugated diene monomer comprising carrying out the copolymerization in a reaction mixture containing a liquid aliphatic hydrocarbon dispersing medium, an anionic catalyst system, and an "A" block of a copolymer dispersing agent, the dispersing agent having at least two polymer blocks wherein at least one of the polymer blocks is soluble in the dispersing medium and at least another of the polymer blocks is insoluble in the dispersing medium and is formed in situ.

14 Claims, No Drawings

1

PROCESS FOR THE PREPARATION OF IN SITU DISPERSION OF COPOLYMERS

FIELD OF THE INVENTION

The present invention relates to an anionic styrene-butadiene type rubber polymerization process conducted in a nonaqueous dispersion utilizing butadiene-type and styrene-type monomers and a dispersing agent formed in situ during polymerization.

BACKGROUND OF THE INVENTION

In many prior art nonaqueous dispersion polymerization systems, organic dispersing medium have been utilized having poor solvent properties for the polymer being produced. A dispersing agent was therefore utilized in the organic medium in order to disperse the polymer being formed throughout the medium. These dispersing agents or dispersants were generally polymeric materials such as block copolymers, random copolymers, or homopolymers as described in U.S. Pat. Nos. 4,098,980 and 4,452,960.

Styrene-butadiene rubbers (SBR) have generally been prepared in solvents in which SBR is soluble. However, only SBR's having a styrene content of less than 35% are soluble in hexane or other non-cyclic aliphatic solvents. These higher styrene content SBR polymers are not completely insoluble in the aliphatic solvents, and, in fact, are highly swollen in these solvents. However, SBR's having a styrene content greater than 35% necessarily have been polymerized in aromatic or cycloaliphatic solvents via solution polymerization.

The applicant first determined that certain pre-made dispersing agents can be utilized to conduct the nonaqueous dispersion polymerization production of SBR having a styrene content greater than 35% by weight in aliphatic dispersing medium such as hexane. Although the dispersion process using a pre-made dispersant works well, it has one shortcoming from a practical or commercial scale up point of view. The dispersant must be prepared separately and stored for subsequent use in the polymerization process. Storage tank and transfer lines require a large capital expenditure and the synthesis of the dispersant and transfer time into the polymerization reactor results in higher production costs.

In these first dispersion SBR studies, a single diblock polymer consisting of a short block (5%–10% of total polymer) of hexane soluble polybutadiene and a long block (90%–95% of total) of high styrene content SBR was prepared in the absence of a dispersing agent. Synthesis of this polymer structure in hexane resulted in either extremely viscous cements or the very undesirable phase separation.

It is therefore desirable to provide a dispersion polymerization process in which there is no need to store the dispersing agent prior to the commencement of the dispersion polymerization process.

It is an object of the present invention to provide a polymerization process employing an anionic initiation system to promote the random polymerization of styrene and butadiene monomers in a nonaqueous dispersion into SBR having 35 to 70% by weight of styrene in the presence of a dispersing agent that is prepared in situ, that is, during the polymerization reaction.

Such a nonaqueous dispersion polymerization process offers many advantages including improved stable dispersions, improved heat transfer, energy savings, high polymer concentrations in the reaction medium, increased production capacity, and the production of very high molecular weight polymers; and no need to store the dispersing agent prior to its use.

SUMMARY OF THE INVENTION

In accordance with the present invention, a process is provided for the preparation of a random copolymer by the nonaqueous dispersion random polymerization of a mixture of 30 to 65% by weight of a conjugated diolefin monomer, preferably butadiene, and 35 to 70% by weight of a vinyl substituted aromatic monomer, preferably styrene, in a liquid aliphatic hydrocarbon dispersion medium with an anionic initiator catalyst system in the presence of a block copolymeric dispersing agent which is prepared in situ. At least one block of the dispersing agent is prepared prior to the dispersion polymerization reaction and at least one block of the dispersing agent is prepared in situ during the dispersion copolymerization. The block that is prepared in situ has the polymer structure of the random copolymer.

DETAILED DESCRIPTION OF THE INVENTION

The copolymer rubbers prepared by the process of the instant invention are random copolymers formed by the copolymerization of a conjugated diene monomer and a vinyl substituted aromatic monomer. A random copolymer is defined as a copolymer of a diene monomer and a vinyl aromatic monomer (VAM) in which no more than 5% by weight of the copolymer is composed of VAM blocks of 10 or more VAM units. Preferably, no more than 5% by weight of the VAM is contained in blocks of 10 or more VAM units. Most preferably, 100% of VAM units are in blocks of less than 10 VAM units and 80% of VAM units are in blocks of less than 5 VAM units. This definition applies to polymers having less than 50% by weight of styrene content. Somewhat higher levels of VAM blocks can be tolerated at 50–70% styrene levels in SBR.

The conjugated diene monomers utilized in the synthesis of such copolymer rubbers generally contain from 4 to 12 carbon atoms. Diene monomers containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Vinyl substituted aromatic monomers, also referred to as vinyl aromatic monomers suitable for use in preparing the random copolymers of this invention include any vinyl or alphamethyl vinyl aromatic compounds capable of being polymerized by an anionic initiator. Particularly useful monomers for this purpose are vinyl aryl and alphamethyl-vinyl aryl compounds such as styrene, alphamethyl styrene, vinyl toluene, vinyl naphthalene, alphamethylvinyl toluene, vinyl diphenyl, and corresponding compounds in which the aromatic nucleus may have other alkyl derivatives up to a total of 8 carbon atoms. Certain vinyl substituted aromatic monomers are not suitable for use in this dispersion polymerization process because homopolymers of these monomers are soluble in linear alkane solvents such as hexane and their copolymers with diene are also soluble. A specific example of an unsuitable monomer type is t-butyl styrene.

The preferred comonomers for use in the process of the present invention are styrene and butadiene for production of a SBR product. In the production of the random copolymers of the present invention, the vinyl substituted aromatic monomer contributed content ranges from 35 to 70% by weight, preferably 40 to 60% by weight, and the diene monomer contributed content ranges from 30 to 65% by weight, preferably 40 to 60% by weight.

The copolymers produced by the process of the present invention can be prepared from any combination of each of the aforementioned conjugated diene and vinyl aromatic monomers. While the following discussion relates to the production of randomized styrene-butadiene rubbers (SBR) from styrene and butadiene monomers, it is apparent that this discussion encompasses the use of any combination of the above-identified vinyl-substituted aromatic hydrocarbons and conjugated dienes. The SBR-type copolymers prepared by the process of the present invention have a number average molecular weight of 20,000–2,500,000 preferably 75,000–500,000 as determined by Gel Permeation Chromatography (GPC). In addition to the ability to make high molecular weight polymers possessing good hot tensile strength, these copolymers have good oil acceptance or extendibility, modulus, tensile strength and stability against heat and aging. These copolymers are especially useful in the production of high performance tires.

The solvents, also known as the dispersing medium, used in the present polymerization process are aliphatic hydrocarbons, preferably linear aliphatic hydrocarbons, including butane, pentane, hexane, heptane, isopentane, octane, isooctane, nonane, and the like and mixtures thereof. Solvents are employed within such a range as being necessary to maintain a dispersion state in said solvent and for properly controlling stability of a polymer dispersion. The insolubility of SBR in a solvent is a function of molecular weight of the polymer, temperature, and the solubility parameter, which is the square root of the cohesive energy density, that is;

solubility parameter $(s.p.) = \sqrt{\Delta E/V}$ wherein E is internal energy and V is the molar volume. For polymers, it is often best to calculate s.p. as displayed in the article "A Method for Estimating the Solubility Parameters and Molar Volumes of Liquids" in *Polymer Engineering & Science*, vol. 14, no. 2, pp 147–154 (1974). The calculated s.p. is 8.6 for polybutadiene, 9.2 for SBR having a 35% styrene content, and 10.5 for polystyrene. The s.p. of n-hexane is 7.3 and a 35% styrene SBR has only partial solubility in n-hexane. The solubility parameter (s.p.) of SBR or other random copolymers produced by the present invention must be at least 1.9 greater than the s.p. of the solvent or dispersing medium, so that the SBR is not completely soluble in the dispersing medium and can thus form an acceptable dispersion. The aliphatic hydrocarbon is used as the liquid medium to disperse the mixture of copolymers into fine particles.

The preferred solvent for use as a dispersing medium in the present process n-hexane. While the solvent may consist of up to 100% of non-cyclic or linear aliphatic hydrocarbons, preferably up to 70% of non-cyclic or linear aliphatic hydrocarbons, up to 30% by weight of the total solvent can be provided by at least one alicyclic hydrocarbon such as cyclopentane, methylcyclopentane, cyclohexane, methylcyclohexane and aromatic hydrocarbons such as benzene and toluene. A higher percentage of VAM units in the SBR allows for a higher percentage of non-aliphatic linear hydrocarbons to be present in a solvent mixture. However, for a SBR with approximately 38 to 42% styrene content, no more than 15% of the solvent should consist of an alicyclic hydrocarbon or admixture such as cyclohexane or methyl cyclopentane, for example. The random copolymer product contains 10 to 50 weight percent solids relative to the liquid hydrocarbon dispersing medium to yield a fluid polymer dispersion which can be easily handled.

The copolymerization process of the present invention is performed in a non-aqueous dispersing medium in the presence of an anionic initiator catalyst system and a block copolymer dispersing agent that is prepared in situ during the copolymerization process. The block copolymer dispersing agents useful in the present invention are polyblock copolymers, in that they are selected from a variety of polymers containing at least two blocks linked by chemical valences wherein at least one of said blocks ("A" block) is soluble in the dispersion medium and at least another of said blocks ("B" block) is insoluble in the dispersion medium. The dispersing agent acts to disperse copolymers hereinafter identified as 'C' copolymers, formed from conjugated dienes and vinyl aromatic monomers which are formed in the presence of the dispersing agent. The insoluble "B" block provides an anchor segment for attachment to the 'C' copolymer, i.e. the SBR polymer. The soluble "A" block of the dispersing agent provides a sheath around the otherwise insoluble copolymer and maintains the copolymeric product as numerous small discrete particles rather than an agglomerated or highly coalesced mass.

The soluble "A" block of the dispersing agent comprises about 1 to about 15 percent by weight of the total dispersion copolymer including the dispersing agent and the 'C' copolymer, i.e., the SBR-type random copolymer. The insoluble "B" block of the dispersing agent is prepared in situ during the polymerization of the SBR-type random copolymer, therefore the "B" block has the same composition as the 'C' copolymers, namely the SBR-type random copolymer formed during the dispersion copolymerization process. The total dispersion copolymer composition preferably contains about 2 to about 10 percent by weight of the soluble "A" block and about 90 to about 98 percent by weight of the insoluble "B" block and 'C' copolymers most preferably from 4 to 8 weight percent of "A" and 92 to about 96 percent by weight of "B" block and 'C' copolymers being most preferred. The number average molecular weight $M_n$ of each "A" block is preferably at least 500 and a maximum of 200,000, most preferably 1,000 to 100,000.

The number average molecular weights of each "B" block is the same as the 'C' copolymers or SBR-type random polymer, namely at least 20,000 and a maximum of 2,500,000, preferably 75,000 to 500,000.

While it is believed that the soluble "A" can be prepared from any monomer providing a soluble block in the dispersing medium subject to known anionic polymerization constraints, it is preferred that the soluble "A" block be selected from a polymer formed by polymerization of conjugated diene monomers or be selected from a copolymer formed by copolymerization of conjugated diene monomers and vinyl substituted aromatic monomers. The soluble "A" block is most preferably selected from a polymer or a copolymer formed from 75 to 100 parts by weight, preferably 75 to 98 parts, of conjugated diene monomer contributed units and 0 to 25 parts by weight, preferably 2 to 25 parts, of vinyl substituted aromatic monomer contributed units with the polymer or copolymer blocks being soluble in the hydrocarbon dispersion medium.

The insoluble "B" block is produced in the dispersion polymerization process during the formation of the random copolymer having the same composition as the random copolymer. The insoluble "B" block is anchored to the surface of or the outer layer of the copolymer particle by physical adsorption processes, as for example, by van der Waals forces. Therefore, its main criteria for success as an anchor is to be relatively immiscible in the dispersing-medium. The "B" block can be prepared by the copolymerization of 30 to 65 parts by weight of conjugated diene monomer contributed units and 35 to 70 parts by weight of vinyl substituted aromatic monomer contributed units.

The preferred dispersing agents, prepared in situ for use in the present process can be represented by the following structural formula:

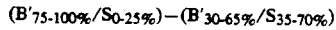

$(B'_{75-100\%}/S_{0-25\%}) - (B'_{30-65\%}/S_{35-70\%})$ wherein B' represents butadiene monomer units and S represents styrene monomer units, all blocks of (B'/S) are randomized copolymers of butadiene and styrene monomers. The subscripts display the possible percentage by weight of each monomer in the blocks. Most preferred diene/vinyl aromatic block copolymers having (1) a first block "A" formed from polybutadiene or by the random copolymerization of styrene/butadiene to form an SBR block having less than 25% by weight of styrene contributed content, and (2) a second block "B" formed from a randomized copolymer of styrene/butadiene having a styrene contributed content comparable with the SBR copolymer to be made by the process of the present invention, namely in the range from 35% to 70% by weight of styrene and 30% to 65% by weight of butadiene.

Diblock A-B dispersing agents are typically prepared utilizing monolithium anionic initiators. The use of dilithium anionic initiators promotes the production of triblock B-A-B dispersing agents. The dispersing agents prepared in situ and used in the preparation of the SBR copolymers are recovered as a blend with the 'C' copolymers, i.e. SBR copolymers. The dispersing agents are prepared and present in an amount ranging from about 2 to 50%, preferably 5-35%, and most preferably 10-25% by weight of the total weight of the dispersion copolymer which includes the dispersing agent and the subsequently formed 'C' copolymer, i.e. SBR copolymer.

The catalyst systems are anionic initiators for use in preparing the SBR copolymers and the dispersing agent, preferably any organolithium catalyst which is known in the art as being useful in the polymerization of vinyl aromatic hydrocarbons and conjugated dienes. Suitable catalysts which initiate polymerization of the monomer system and dispersing agent include organolithium catalysts which have the formula $R(Li)_x$ wherein R represents a hydrocarbyl radical of 1 to 20, preferably 2-8, carbon atoms per R group, and x is an integer of 1-4, preferably 1 or 2. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl n-octyl, n-decyl, cyclopentyl-methyl, cyclohexyl-ethyl, cyclopentylethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include: phenyllithium, naphthyllithium, 4-butylphenyllithium, p-tolyllithium, 4-phenylbutyllithium; 4-butylcyclohexyllithium, 4-cyclohexylbutyllithium, 1,4-dilithiobutane, 1,10-dilithio-decane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicoxane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Mixtures of different lithium catalysts can also be employed, preferably containing one or more lithium compounds such as $R(Li)_x$. The preferred lithium catalyst for use in the present invention is n-butyllithium.

Other lithium catalysts which can be employed are lithium dialkyl amines, lithium dialkyl phosphines, lithium alkyl aryl phosphines, lithium diaryl phosphines and trialkyl tin lithium such as tributyl-tin-lithium.

Anionic initiators are typically employed in amounts ranging from 0.2 millimoles to 100 millimoles of anionic initiator per hundred grams of monomer in the reaction vessel.

All amounts of anionic initiator are indicated by hundred grams of monomer or by ratio of components in the instant invention and are considered to be catalytically effective amounts, that is, effective amounts for initiating and conducting polymerization of the dispersing agent and the disclosed monomer systems to produce copolymers of the present invention.

It is preferred to utilize 10 to 50% by weight of the anionic initiator to prepare the initial "A" block of the dispersing agent. The remaining portion of the initiator is then added during the charging of the monomers to simultaneously produce the "B" block of the dispersing agent and the copolymer from vinyl aromatic monomers and conjugated diene monomers.

A SBR copolymer randomizing agent such as an ether or an amine is preferably added to the SBR dispersion polymerization system as part of the catalyst system in an amount effective to promote random copolymerization of the styrene and butadiene monomers. Other suitable randomizing agents are well known in the art such as sodium or potassium alkoxides. Randomizing agents are employed in the polymerization system in amounts generally ranging from a molar ratio of 1:100 to 1:1 of randomizing agent to anionic initiator.

Modifying agents such as ethers, tertiary amines, chelating ethers or amines, and sodium or potassium alkoxides or alkyls, may be added to increase the 1,2-addition reaction of the diene monomer in the SBR. Such modifying agents are well known in the art, such as tetrahydrofuran, tetramethylethylene diamine, diethylether and the like, and these modifying agents may be employed in amounts generally ranging from 1:10 to 100:1 molar ratio of the modifier to anionic initiator. The 1,2-addition product can be increased from the 5–15% range to as high as 90–100% of the diene monomer units being incorporated into the "A" or "B" block of the dispersing agent and the 'C' copolymer.

The preferred 1,2-vinyl content of the "B" block and the 'C' copolymer, i.e. SBR produced in accordance with the process of the instant invention, ranges between 10 to 65% of the diene monomer contributed units. The 1,2-vinyl content in the diene contributed units of the "B" block of the dispersing agent is thus identical to the desired final 1,2-vinyl content of the 'C' copolymer being produced herein.

The reaction mixture utilized in the nonaqueous dispersion polymerization of butadiene and styrene to produce a random copolymer having a styrene content between 35 and 70 percent is comprised of a liquid nonaqueous dispersion medium, the living "A" block of a dispersing agent, 30 to 65 parts by weight of butadiene monomer and 35 to 70 parts by weight of styrene monomer, and catalyst system. Such a polymerization can be run over a temperature range from 0° up to 150° C. Most generally, it is preferred to utilize a reaction temperature from 40° C. to 110° C. The reaction time required in such a polymerization will vary with the reaction temperature, monomer concentration, catalyst system, and catalyst level. Generally, this reaction time will vary from about 20 minutes up to about 30 hours. Commonly, it will be preferred to utilize a reaction time from about 1 up to about 6 hours.

The amount of butadiene and styrene monomers that can be utilized in such a nonaqueous dispersion polymerization reaction mixture can be varied from about 10 to about 50 weight percent by weight based upon the total reaction mixture. It is preferred to have a final polymer concentration ranging from 20 to 35 percent by weight based upon the total reaction mixture.

It is desirable to conduct this polymerization in an oxygen and moisture free environment. For example, it is desirable to sparge the reaction vessel with dry nitrogen (or other inert gas) and to run the polymerization under a dry nitrogen atmosphere. The pressure in the reaction system during the polymerization generally will be a function of the inert gas concentration, polymerization temperature, the monomer concentration, and the vapor pressure of nonaqueous dispersion medium. The polymerization pressure will usually be maintained within the range between 1.0 and 15 atmospheres.

The nonaqueous dispersion polymerization can be run in a batch process by simply adding the initiator components to a nonaqueous dispersion medium containing butadiene and styrene monomers and the "A" block of a polymeric dispersing agent to form the reaction mixture. In a semi-batch process, the monomers are metered into the reactor containing the dispersion medium and an anionic initiator. The "A" block of the dispersing agent can either be metered into the reactor with the monomers or added to the reactor before the monomers are added or is preferably premade in the reactor as in the following examples. During the course of the polymerization it will generally be desirable to provide some form of agitation to the reaction mixture, such as stirring, shaking, or tumbling. A short stopping agent such as an alcohol may be employed to terminate the polymerization after the desired reaction time or at the desired percent conversion of monomers to copolymer. In general, the conversion of monomers into polymers is allowed to proceed to about completion. An appropriate antioxidant can be added at this stage of the process.

The nonaqueous dispersions formed in this polymerization have a solids concentration ranging between about 10 to 50 weight percent and are quite fluid. This fluidity permits greatly improved heat transfer as compared to the fluidity of solutions of SBR copolymers prepared using solution polymerization techniques. Due to the relative fluidity of these nonaqueous dispersions, both a higher molecular weight polymer can be produced and the concentration of dispersed SBR copolymers in the medium can be increased by 25 to 100% or more over the maximum allowable concentrations in solution polymerization techniques.

The elastomeric SBR copolymer can be recovered from the hydrocarbon solvent by steam desolventization or by drum drying techniques thus providing energy savings due to higher solids levels. By proper control of particle size, the polymers can be recovered by filtration or centrifugation techniques.

The recovered copolymer products, depending on their molecular weights and compositions, can be used for a variety of goods such as tires and various rubber molded products.

It is believed that one skilled in the art can, using the preceding description, utilize the present invention to its fullest extent. The following preferred specific embodiments are, therefore, to be construed as merely illustrative of the catalyst system and the polymerization process of the present invention. All percentages identified in the examples are by weight unless otherwise indicated.

EXAMPLES 1 AND 2

Preparation of "A" Block of Dispersing Agent

A one gallon reactor was charged with 30 g. of 10% styrene/90% butadiene in 500 ml of hexane, 0.8 mmole of n-butyllithium and 3.2 mmoles of tetrahydrofuran (THF). The reactor was heated to and maintained at 95° C. for ten minutes, after which time 5 mmoles of isopropanol were added to terminate the reaction to provide the "A" block of a dispersing agent. This procedure was repeated a second time and the properties of the first and second recovered "A" blocks are as follows as shown in Examples 1 and 2.

TABLE I

|  | EXAMPLE NO. | |
| --- | --- | --- |
|  | 1 | 2 |
| Yield % | 68.7 | 80.0 |
| $M_n$ (GPC) | 80,400 | 57,000 |
| $M_w/M_n$ | 1.38 | 1.45 |
| Vinyl % | 18.9 | 18.9 |
| Styrene % | 7.2 | 7.7 |
| $T_g$ (DSC) °C. | −84 | −82 |

EXAMPLES 3 TO 12

In situ dispersion polymerization reactions were conducted utilizing reactants and in accordance with conditions identified in Tables II and III in Examples 3 to 12. The "A" blocks of dispersing agents used in each example were prepared in hexane following the same procedure of Example 1 utilizing the reactants and conditions displayed under Step 1 in Tables II and III, however the blocks were not terminated. Examples 3 to 7 employed n-butyllithium as the RLi initiator and examples 8 to 12 employed tributyl-SnLi as the RLi initiator in the amounts indicated. The modifiers utilized in these examples included tetrahydrofuran (THF), bis oxolanyl propane (OOPS) and tetramethylethylene diamine (TMEDA) in amounts identified as modifier millimoles (MOD mmol).

After formation of the first living "A" block copolymer in each example, the living "A" block copolymer in solution as prepared in Step 1 and a subsequent charge identified under Step 2 in Tables II and III of 1,3-butadiene (1,3-BD) in 24.9% hexane solution and styrene in 33% hexane solution were blended along with additional anionic initiator (RLi) in the reactor either in a batch or semibatch (SEMI) reaction (RXN TYPE). Each reaction proceeded at the indicated time and temperature. Polymerizations were terminated in Examples 3 to 7 by the addition of isopropanol and were terminated in Examples 8 to 12 by the addition of dibutyl-SnCl$_2$. These polymerization processes yielded an A-B diblock copolymer dispersing agent which was formed in situ with a random copolymer (identified in Tables II and III as 'C' polymer). The composition of the 'C' polymer and the "B" block were equivalent. Good dispersions were formed in all examples at both the reaction temperature (hot) and at room temperature (cold). Product properties of the recovered blends of A-B diblock dispersing agent and random copolymer are displayed under product properties on Tables II and III. The solids levels of the resultant dispersions produced in Examples 3 to 12 ranged between 21 to 25 percent.

TABLE II
IN SITU DISPERSION SBR USING n-BuLi

| | Example No. | | | | |
|---|---|---|---|---|---|
| | 3 | 4 | 5 | 6 | 7 |
| STEP 1 | | | | | |
| 'A' BLOCK PREPARATION | | | | | |
| 1,3-BD (g) | 24 | 27 | 13.5 | 13.5 | 27 |
| STYRENE (g) | 3 | 3 | 1.5 | 1.5 | 3 |
| RLi (mmol) | 0.7 | 1.0 | 1.0 | 1.0 | 1.0 |
| MODIFIER | THF | OOPS | OOPS | OOPS | TMEDA |
| MOD. (mmol) | 8.0 | 4.0 | 0.5 | 0.3 | 0.4 |
| TEMP. (°F.) | 150 | 200 | 200 | 200 | 200 |
| TIME (min.) | 60 | 10 | 10 | 10 | 10 |
| STEP 2 | | | | | |
| 'B' BLOCK & 'C' POLYMER PREPARATION | | | | | |
| 1,3-BD (g) | 266 | 250 | 155 | 155 | 226 |
| STYRENE (g) | 199 | 204 | 303 | 303 | 228 |
| RLi (mmol) | 3.0 | 3.0 | 4.2 | 2.2 | 3.0 |
| MOD. (mmol) | — | — | — | — | — |
| RXN TYPE | SEMI | BATCH | SEMI | SEMI | SEMI |
| TIME (min.) | 80 | 150 | 70 | 80 | 95 |
| TEMP. (°F.) | 200 | 277 (max) | 200 | 200 | 200 |
| PRODUCT PROPERTIES | | | | | |
| $T_g$ (°C.) | −47 | −18 | +5 | −4 | −34 |
| $^1$H NMR | | | | | |
| % VINYL (BD = 100) | 17.2 | 47.2 | 39.5 | 35.0 | 20.5 |
| % STYRENE | 36.8 | 45.6 | 67.7 | 67.3 | 51.1 |
| % BLOCK (STY = 100) | 4.4 | 26.1 | 45.9 | 42.4 | 27.3 |
| GPC | | | | | |
| $M_n/10^{-3}$ | 205 | 158 | 127.2 | 177.3 | 165.1 |
| $M_w/M_n$ | 1.32 | 1.25 | 1.6 | 1.59 | 1.44 |
| PHYSICAL STATE OF DISPERSION | | | | | |
| HOT | MEDIUM VISC. | LOW VISC. | LOW VISC. | LOW VISC. | MEDIUM VISC. |
| COLD | LOW | LOW | LOW | LOW | LOW |

TABLE II-continued
IN SITU DISPERSION SBR USING n-BuLi

| | Example No. | | | | |
|---|---|---|---|---|---|
| | 3 | 4 | 5 | 6 | 7 |
| | VISC. | VISC. | VISC. | VISC. | VISC. |

TABLE III
IN SITU DISPERSION SBR USING BU$_3$SnLi

| | Example No. | | | | |
|---|---|---|---|---|---|
| | 8 | 9 | 10 | 11 | 12 |
| STEP 1 | | | | | |
| 'A' BLOCK PREPARATION | | | | | |
| 1,3-BD (g) | 24 | 36 | 27 | 27 | 27 |
| STYRENE (g) | 3 | 4 | 3 | 3 | 3 |
| RLi (mmol) | 0.7 | 0.8 | 0.8 | 0.8 | 0.8 |
| MODIFIER | THF | THF | THF | THF | THF |
| MOD. (mmol) | 3.5 | 1.6 | 3.2 | 3.2 | 3.2 |
| TEMP. (°F.) | 150 | 195 | 200 | 200 | 200 |
| TIME (min.) | 45 | 10 | 10 | 10 | 10 |
| STEP 2 | | | | | |
| 'B' BLOCK & 'C' POLYMER PREPARATION | | | | | |
| 1,3-BD (g) | 266 | 276 | 267 | 271 | 280 |
| STYRENE (g) | 199 | 184 | 193 | 189 | 180 |
| RLi (mmol) | 4.1 | 4.2 | 4.2 | 4.2 | 4.2 |
| MOD. (mmol) | 20.5 | 8.4 | 8.4 | 8.4 | 8.4 |
| RXN TYPE | SEMI | SEMI | SEMI | SEMI | SEMI |
| TIME (min.) | 75 | 67 | 90 | 90 | 85 |
| TEMP. °F. | 190 | 200 | 200 | 200 | 200 |
| PRODUCT PROPERTIES | | | | | |
| $T_g$ (°C.) | −34 | −47 | −39 | −39 | −43 |
| $^1$H NMR | | | | | |
| % VINYL (BD = 100) | 23.2 | 17.6 | 18.7 | 18.9 | 19.2 |
| % STYRENE | 40.0 | 36.4 | 39.5 | 38.6 | 37.3 |
| % BLOCK (STY = 100) | 3.8 | 6.4 | 8.9 | 9.6 | 9.1 |
| GPC | | | | | |
| $M_n/10^{-3}$ | 196.2 | 180.4 | 165.7 | 160.8 | 154.1 |
| $M_w/M_n$ | 1.49 | 1.52 | 1.54 | 1.51 | 1.55 |
| PHYSICAL STATE OF DISPERSION | | | | | |
| HOT | MEDIUM VISC. | MEDIUM VISC. | LOW VISC. | LOW VISC. | MEDIUM VISC. |
| COLD | LOW VISC. | MEDIUM VISC. | LOW VISC. | LOW VISC. | LOW VISC. |

While certain representative embodiments and details have been shown for the purpose of illustrating the invention, it will be apparent to those skilled in the art that various changes and modifications may be made therein without departing from the scope of the invention.

I claim:

1. A process for the preparation of a dispersion copolymer by the dispersion copolymerization of 35 to 70% by weight of a vinyl aromatic monomer and 30 to 65% by weight of a conjugated diene monomer comprising carrying out the copolymerization in a hydrocarbon dispersing medium in the presence of a block copolymer dispersing agent having a preformed block and at least one block formed in situ during the copolymerization of the dispersion copolymer and a catalytically effective amount of an anionic initiator, the preformed block being soluble in the dispersing medium and the block formed in situ being insoluble in the dispersing medium.

2. The process as defined in claim 1 wherein the dispersion copolymerization is conducted in a hydrocarbon dispersing medium comprising at least 70% by weight of non-cyclic aliphatic hydrocarbons.

3. The process as defined in claim 2 wherein the non-cyclic aliphatic hydrocarbon comprises n-hexane.

4. The process as defined in claim 1 wherein the dispersion copolymer is formed by the copolymerization of 40 to 60% by weight of a vinyl aromatic monomer and 40 to 60% by weight of a conjugated diene monomer.

5. The process as defined in claim 1 wherein the block copolymer dispersing agent is formed in situ during the copolymerization process by adding the preformed block formed prior to the dispersion copolymerization by the copolymerization of 0 to 25% by weight of a vinyl aromatic monomer and 75 to 100% by weight of a conjugated diene monomer in the presence of an anionic initiator, the preformed block being soluble in the dispersing medium.

6. The process as defined in claim 5 wherein the block copolymer dispersing agent is an A-B diblock copolymer having a dispersing medium soluble preformed block A and a dispersing medium insoluble block B formed in situ by the polymerization of 35 to 70% by weight of a vinyl aromatic monomer and 30 to 65% by weight of a conjugated diene monomer.

7. The process as defined in claim 6 wherein the block copolymer dispersing agent is an A-B diblock copolymer obtained by using a monolithium anionic initiator.

8. The process as defined in claim 5 wherein the block copolymer dispersing agent formed in situ is a triblock copolymer resin obtained by using a dilithium anionic initiator.

9. The process as defined in claim 1 wherein the vinyl aromatic monomer is styrene.

10. The process as defined in claim 1 wherein the conjugated diene is 1,3-butadiene.

11. The process of claim 1 wherein the dispersing agent comprises about 2 to about 50 weight percent of the total weight of the dispersion copolymer.

12. The process of claim 1 wherein the soluble polymer block of the dispersing agent comprises 1 to 15% by weight of the total weight of the dispersion copolymer.

13. The process of claim 1 wherein the dispersion copolymer formed in situ by the dispersion copolymerization process is present in concentrations ranging between about 10 to 50 weight percent.

14. The process of claim 1 wherein the block formed in situ has a number average molecular weight ranging between 20,000 and 2,500,000.

* * * * *